United States Patent [19]

Younkin et al.

[11] Patent Number: 4,624,821
[45] Date of Patent: Nov. 25, 1986

[54] PROCESS FOR FORMING ORIENTED CONTAINERS

[75] Inventors: Harry A. Younkin, Newark, Del.; Gottfried Mehnert, Berlin; Uwe V. Roos, Bodenteich-Uelzen, both of Fed. Rep. of Germany

[73] Assignee: Metal Box Enterprises Inc., Westport, Conn.

[21] Appl. No.: 760,989

[22] Filed: Jul. 31, 1985

Related U.S. Application Data

[62] Division of Ser. No. 169,141, Jul. 15, 1980, Pat. No. 4,560,340.

[30] Foreign Application Priority Data

May 16, 1980 [DE] Fed. Rep. of Germany ... 801027061

[51] Int. Cl.$^4$ ............................................. B29C 49/14
[52] U.S. Cl. ..................... 264/532; 264/535
[58] Field of Search ............... 264/523, 532, 535, 538, 264/542, 543; 425/526, 529, 531, 532, 534, 538

[56] References Cited

U.S. PATENT DOCUMENTS

| Re. 29,065 | 12/1976 | Uhlig | 264/89 |
|---|---|---|---|
| 2,783,503 | 3/1957 | Sherman | 264/542 |
| 2,943,348 | 7/1960 | Mumford et al. | 425/531 |
| 3,217,071 | 11/1965 | Plymale et al. | 264/98 |
| 3,288,317 | 11/1966 | Wiley | 215/1 |
| 3,507,005 | 4/1970 | Wiley et al. | 264/94 |
| 3,525,123 | 8/1970 | Cines et al. | 264/94 |
| 3,632,261 | 1/1972 | Gasior et al. | 425/292 |
| 3,651,186 | 3/1972 | Hall | 264/94 |
| 3,751,542 | 8/1973 | Hall | 264/99 |
| 3,765,813 | 10/1973 | Moore | 425/174 |
| 3,790,319 | 2/1974 | Hudson et al. | 425/387 B |
| 3,798,295 | 3/1974 | MacDuff | 264/99 |
| 3,801,690 | 4/1974 | Gilbert | 264/99 |
| 3,806,587 | 4/1974 | Turner | 425/387 B |
| 3,852,398 | 12/1974 | Moore | 264/94 |
| 3,872,203 | 3/1975 | Yoshikawa et al. | 264/94 |
| 3,878,033 | 4/1975 | Zavasnik | 428/36 |
| 3,892,830 | 7/1975 | Hudson et al. | 264/94 |
| 3,896,200 | 7/1975 | Wiley et al. | 264/89 |
| 3,899,279 | 8/1975 | Hudson et al. | 425/387 B |
| 3,982,872 | 9/1976 | Kauffman et al. | 425/397 |
| 3,985,850 | 10/1976 | Seefluth | 264/98 |
| 4,011,039 | 3/1977 | Oas et al. | 425/397 |
| 4,065,635 | 12/1977 | LeGrand | 264/94 |
| 4,106,886 | 8/1978 | Sokolow | 425/526 |
| 4,116,607 | 9/1978 | LeGrand | 425/525 |
| 4,120,634 | 10/1978 | Michel et al. | 425/525 |
| 4,153,408 | 5/1979 | Albert et al. | 425/532 |

FOREIGN PATENT DOCUMENTS 2364663 7/1975 Fed. Rep. of Germany .

*Primary Examiner*—Jan Silbaugh
*Attorney, Agent, or Firm*—Stephen F. K. Yee

[57] ABSTRACT

A process and apparatus for the blow molding of oriented, hollow containers from tubular parisons in which a tubing of plastic material at a suitable orientation temperature for the material is passed by a puller assembly to a cutter assembly. The free end of the tubing is grasped by a parison transfer assembly, after which parisons are cut from the tubing by the cutter assembly and positioned by the transfer assembly for placement within blow molders. The first of two blow molders moves toward the tubing centerline from a molding position to receive a parison. The parison transfer assembly is extended vertically to place the parison within the molding cavity of the open blow molder. The upper end of the parison is grasped by a tube clamp, and as the parison transfer assembly retracts, the parison is stretched prior to molder closure. The closed blow molder returns to its molding position to complete the blow molding of a finished, oriented container. The parison transfer assembly accumulates another parison and positions it for placement within the second blow molder, which has moved from its blow molding position, and the cycles are repeated. Alternate embodiments are described for the parison transfer assembly and for parison stretching.

21 Claims, 22 Drawing Figures

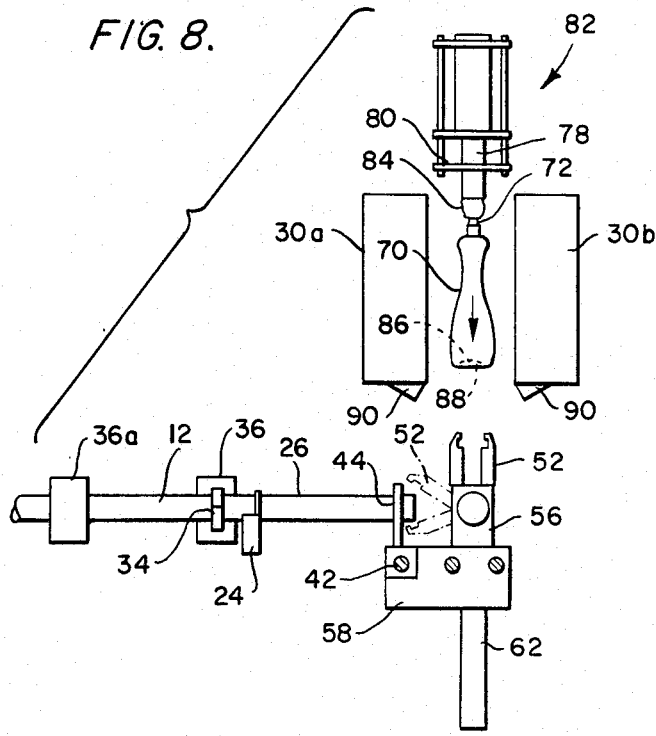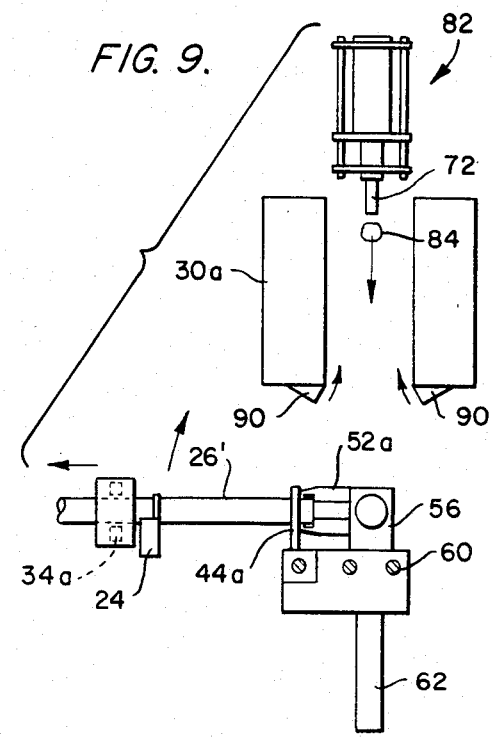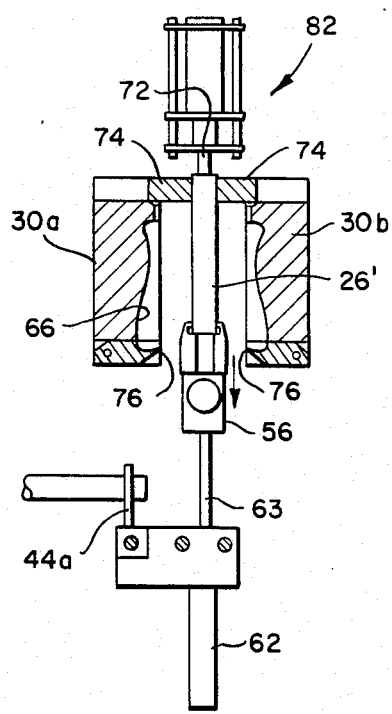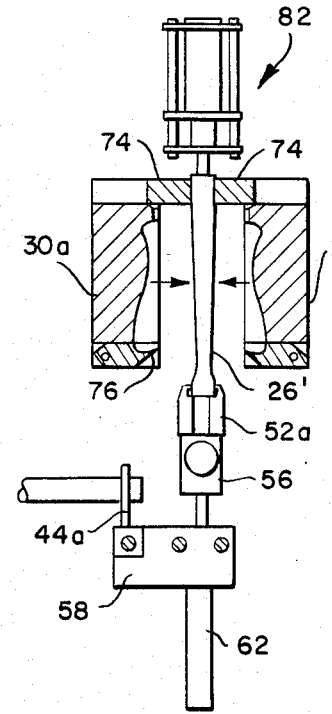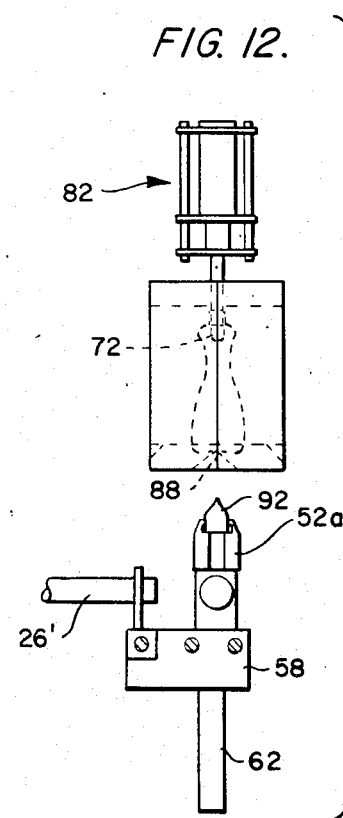

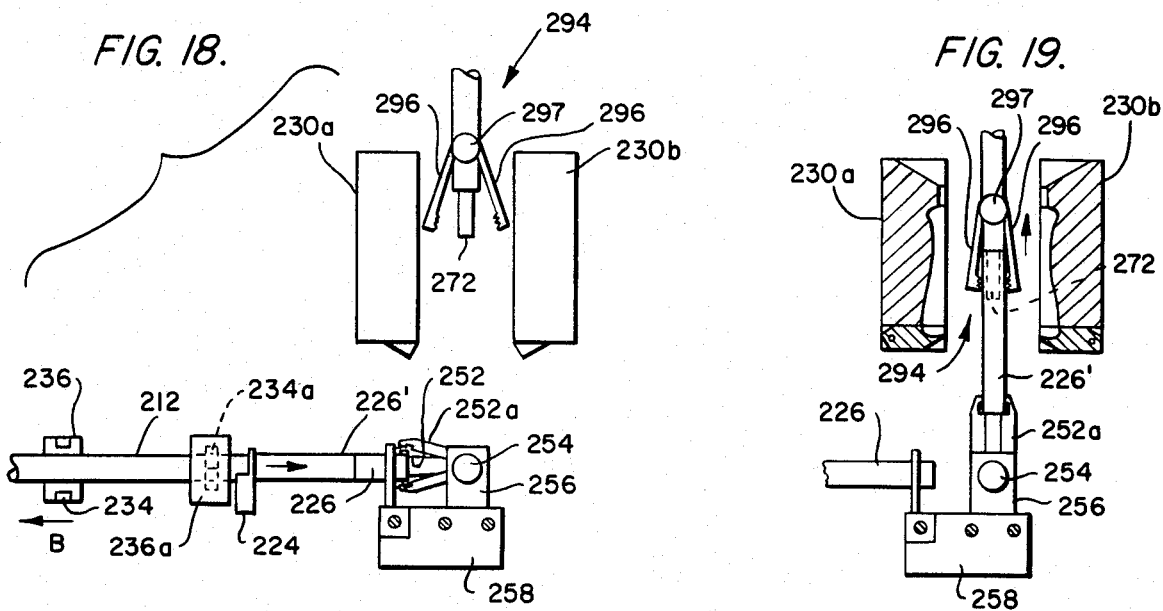
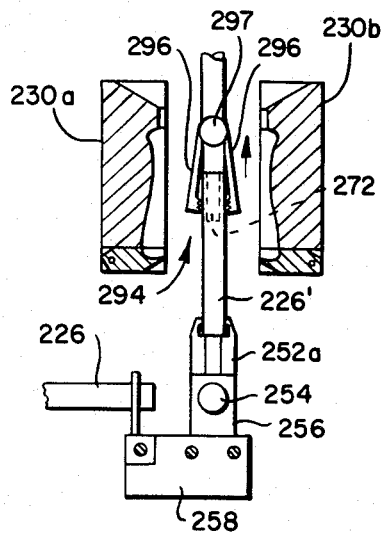
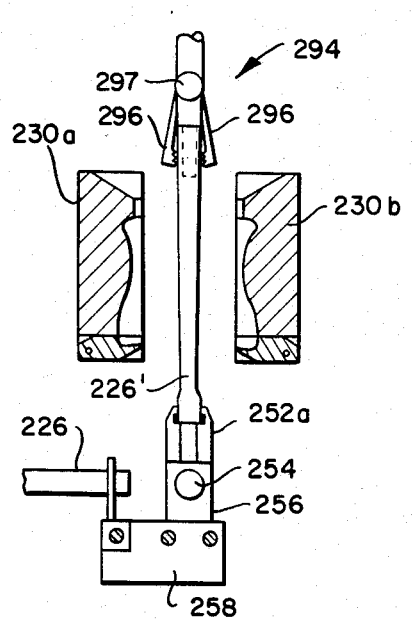
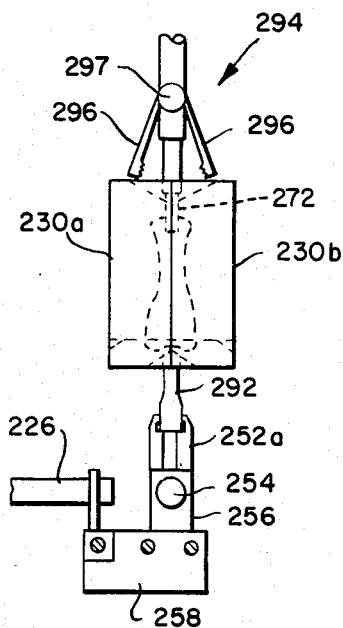
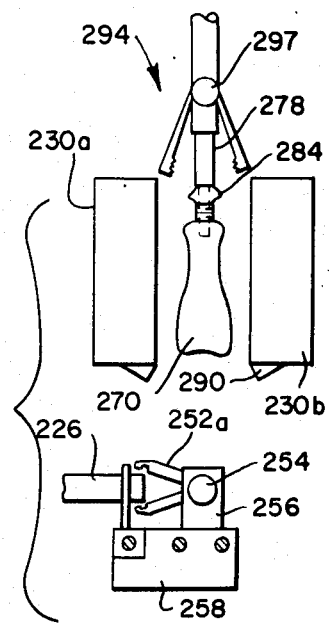

PROCESS FOR FORMING ORIENTED CONTAINERS

This application is a division of application Ser. No. 169,141, filed 15 July 1980, now U.S. Pat. No. 4,560,340, issued Dec. 24, 1985.

BACKGROUND OF THE INVENTION

1. Field of the Invention

This invention relates generally to the blow molding of containers, and is more particularly directed to the blow molding of completely finished hollow containers of molecularly oriented plastic material.

2. Description of the Prior Art

Blow molded molecularly oriented hollow containers possess improved physical characteristics, such as increased strength and transparency. Generally, in the technique for blow molding oriented containers, a cooled tubular preform is heated to a suitable orientation temperature, stretched along the longitudinal axis of the preform to orient the material axially and then blown to the final configuration of the container within a mold cavity, orienting the material transversely.

Various processes and apparatuses exist in the prior art for the blow molding of containers of molecularly oriented material. For example, techniques exist in which a continuous tubing of thermoplastic material is extruded, cooled, reheated to a suitable orientation temperature and blow molded to form a series of hollow containers connected by surplus material. Blow molding may be achieved by sequentially closing cooperating mold halves onto the tubing as it is removed from a reheating oven and forming the container as the mold halves and the tubing move away from the oven. Longitudinal stretching of the material is achieved by moving the mold halves at a speed greater than the speed with which the tubing is being extruded. Examples of this technique are disclosed in U.S. Pat. Nos. 3,798,295, issued to R. MacDuff; 3,751,542, issued to J. N. Hall; and 3,288,317, issued to S. E. Wiley.

Blow molding of containers from a continuous tubing provides good control of the temperature conditions of the tube material which is necessary for good results, and provides a high speed and consequently a high production rate molding technique. However, since the containers are joined together in a continuous string, additional finishing steps are required to separate the containers from the surplus material and to provide an opening in the container neck.

Another general technique for blow molding hollow containers of molecularly oriented material involves cutting short lengths from an extruded tube which has been cooled. The tube lengths or preforms are then heated to a suitable orientation temperature for the material and blow molded. The blow molding may be achieved in different ways, one of which is to place the heated preforms within a mold, forming the neck region and closure threads, if provided, at one end of the preform, stretching the preform either by pulling the preform or by extension of a stretching rod placed within the preform, and then molding the container within the mold cavity. Examples of prior art techniques in which the oriented containers are blow molded in a single molding process from heated preforms are disclosed in U.S. Pat. Nos. 4,106,886, 4,011,039, 3,982,872, 3,896,200, and 3,525,123. Other examples of this technique are disclosed in U.S. Pat. Nos. 3,899,279, 3,872,203, 3,852,398, and 3,765,813.

The blow molding also may be achieved in a two stage process in which the heated preform is placed within a first or a pre-form, mold wherein the neck region and thread closures, if provided, are molded at one end of the preform, and the remainder of the preform is given a shape which resembles the ultimate container configuration. The molded preform is then transferred to a second blow molder in which the container is molded to its final shape.

In the foregoing techniques involving blow molding from heated preforms in which the container neck portions are molded and then the remainder of the parisons are stretched and blow molded, the resulting containers have oriented material in the body but the finished neck does not have oriented material. The neck region, therefore, lacks the clarity and strength that is partially obtainable in a container having at least axially-oriented material. To overcome this problem, processes have been developed which provide orientation of the material in the container neck region. Examples of such processes are disclosed in U.S. Pat. Nos. 3,651,186, issued to J. N. Hall, and 4,065,355 and 4,116,607, issued to R. W. LeGrand in which the preforms are stretched prior to the neck forming and blow molding of the container, thus resulting in orientation of the material in the neck region.

The primary advantage in working with individual preforms is that it is possible to produce a substantially completely finished molded container requiring minimum additional finishing. However, in the techniques known in the prior art the close temperature control over the thermoplastic material and the high production capabilities possible with the continuously-extruded tube technique are not as easily achieved with individual preforms. Additionally, provisions must be made for handling the preforms between the heater and the blow molder, and the above noted patents illustrate different proposals for accomplishing this handling.

Prior art attempts have been made to combine the best features of the continuous tube and individual preform techniques. For example in U.S. Pat. Nos. Re. 29,065, 4,120,634 and 3,806,587, processes used in the blow molding of non-oriented thermoplastic material have been adapted to the production of containers from oriented material. Generally, these techniques involve the continuous extrusion of the thermoplastic material, the severing of lengths of the extrudate which is immediately placed in a blow molder, either a pre-form or a final form molder, and the subsequent achievement of the longitudinal stretching of the material. The apparatuses utilized in these techniques, however, have been complex because of the requirement to thermally condition and to control the temperature of the extruded material after it has been severed and during the blow molding process.

SUMMARY OF THE INVENTION

Accordingly, it is an object of the present invention to provide a process and apparatus for the blow molding of molecularly oriented containers.

Another object of the invention is to provide a process and apparatus of the foregoing type for blow molding a completely finished container of oriented material within the mold.

Another object of the present invention is to provide a process and apparatus of the foregoing type for blow molding oriented containers from tubular preforms.

Yet another object of the present invention is to provide a process and apparatus of the foregoing type which exhibits the desirable features and advantages of working with a continuously extruded tubing of orientable material.

Yet a further object of the invention is to provide a process and apparatus of the foregoing type which blow molds in a single step a completely finished container of oriented material from a tubular preform severed from a continuous reheated tube of orientable material.

Still another object of the present invention is to provide a process and apparatus of the foregoing type in which the tubular preform handling means is also used to effect mechanical stretching of the orientable material.

These and other objects of the present invention are achieved in a blow molding process and apparatus which includes a puller assembly for pulling a continuous tube of orientable material from a heating chamber; a cutter assembly for severing individual lengths of parisons from the tube; a parison transfer assembly which accumulates a plurality of parisons and transfers them to a blow molder; and blow molders which move between parison receiving and blow molding positions. In one embodiment, the transfer assembly includes an accumulator or pre-shuttle which reciprocates to place each of two pairs of grippers along the centerline of the tube. A main shuttle, which reciprocates in a plane parallel to the pre-shuttle, has two sets of clamps which align with the pairs of grippers of the pre-shuttle to grasp the ends of the parisons and rotate the parisons into position.

The first of two blow molders moves toward the centerline of the tube to receive the parisons. The main shuttle extends vertically to place the parisons within the molding cavities of the open blow molder, the upper ends of the parisons are grasped by tube clamps disposed above the upper portion of the blow molder, and as the shuttle retracts the parisons are stretched prior to molder closure. Surplus material at the bottom of each parison is severed by the blow molder and discarded as the shuttle returns to pick up additional parisons. The blow molder then returns to its molding position to complete the blow molding process, after which the finished, oriented containers are removed.

Meanwhile, the pre-shuttle has accumulated additional parisons which are received by the shuttle, rotated into position, and accordingly placed within the molding cavities of the second blow molder which has moved in from its outboard molding position. The foregoing process is repeated, with the movement and duration of the apparatus components and process steps appropriately controlled.

An alternate embodiment of the parison transfer assembly includes two shuttles reciprocating in a common plane which accumulate and rotate the parisons into position, place the parisons within the blow molder and stretch the parisons. Also, an alternate embodiment for stretching the parison includes a blow pin assembly movable along the longitudinal axis of the blow pin, in which the blow pin assembly moves between separated mold sections to receive the free end of a parison which has been rotated from its horizontal position by the transfer assembly, the upper end of the parison is received on the blow pin and secured thereon by pivoted tube clamps, and the parison is stretched by withdrawal of the blow pin assembly.

BRIEF DESCRIPTION OF THE DRAWINGS

The above description, as well as further objects, features and advantages of the present invention, will be more fully appreciated by reference to the following description of presently-preferred but nonetheless illustrative embodiments in accordance with the invention, and the accompanying drawings, wherein:

FIG. 8 is a view along line 8—8 in FIG. 3;

FIG. 9 is a view along line 9—9 in FIG. 4;

FIG. 10 is a view along line 10—10 in FIG. 5;

FIG. 11 is a view as in FIG. 10 wherein a later stage in the operation of the parison transfer system is shown;

FIG. 12 is a view along line 12—12 in FIG. 6;

FIGS. 18-22 are views similar to FIGS. 8-12, but illustrating an alternate embodiment for parison stretching.

DESCRIPTION OF THE PREFERRED EMBODIMENTS

Figure 1:
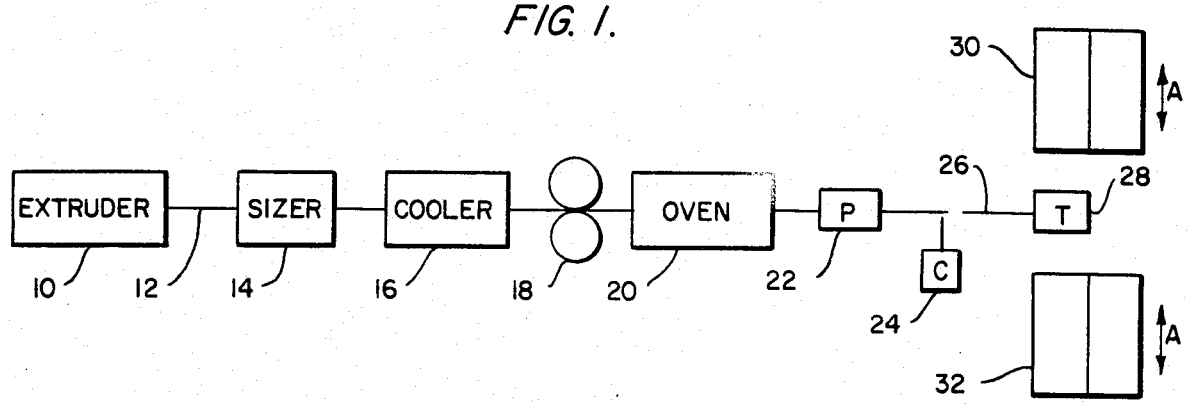
FIG. 1 is a flow diagram of the apparatus of the present invention.

Referring now to the drawings, and particularly to the flow diagram of FIG. 1, an extruder 10 extrudes a continuous tube 12 which passes through a sizer 14 in which the inner and outer diameters of the tube are sized and then through a cooler 16. As an example, for polypropylene material the tube is cooled to about 49° C. (120° F.) to hasten crystallization. The tube 12 is drawn from the extruder 10, through the sizer 14 and the cooler 16 by drive means 18, which may conveniently be embodied as a set of rotatably-mounted, opposed tires. The tube 12 is reheated in an oven 20 to a suitable orientation temperature, or about 140° C.-165° C. (284° F.-329° F.) for polypropylene, and after being reheated, is pulled from the oven by a puller assembly 22, past a cutter 24 which cuts individual lengths or parison 26 from the tube.

With continued reference to FIG. 1, a parison 26 is grasped at one end portion by a transfer assembly 28 and rotated vertically for placement within one of two blow molders 30 and 32, each of which moves inward from the illustrative blow molding position indicated in FIG. 1, to a position directly over the transfer assembly 28, which is extended vertically to place the parison 26 onto a blow pin (not shown) disposed within the blow molder. The upper end of the parison 26 is grasped by tube clamps (not shown) disposed above the upper portion of the molder, for example 30, and as the transfer assembly 28 retracts, the parison is stretched prior to closure of the molder. Excess material at the bottom of the parison is severed after closure of the molder 30 and is discarded as the transfer assembly 28 returns to pick up additional parisons. The blow molder 30 then returns to the outboard, molding position to complete the blow molding of a completely finished container. Meanwhile, the transfer assembly 28 has accumulated an additional parison 26 which is rotated into position. The second blow molder 32 moves in from its outboard, molding position to receive the parison, in the manner just described for the molder 30. The process is repeated, with a suitable control system (not shown) regulating movement and timing of the apparatus components and process steps.

While the apparatus illustrated in FIG. 1 shows two blow molders, one may be used, although the speed in blow molding containers would be slower. Alternatively, more than two blow molders may be used, each being positioned to alternately receive a parison from the transfer assembly. Further, each blow molder may contain any suitable number of molding cavities. Also, instead of the blow molder moving toward the transfer assembly to receive the parison, the blow molder may remain stationary and the transfer assembly move toward the molder to position the parison therein, or the transfer assembly and the blow molder may both move to a common position to effect parison transfer.

By way of illustration, the structure of the blow molders 30 and 32 and the blow molding process utilized therein may be as described in U.S. Pat. Nos. 4,116,607 and 4,065,355, issued to R. W. LeGrand. While each of the blow molders 30 and 32 may be provided with any suitable number of molding cavities, dependent upon the desired production for the process, for the purposes of the following description each of the blow molders has two molding cavities and the requisite parison transfer structures to place simultaneously two parisons within each molder.

Figure 2:
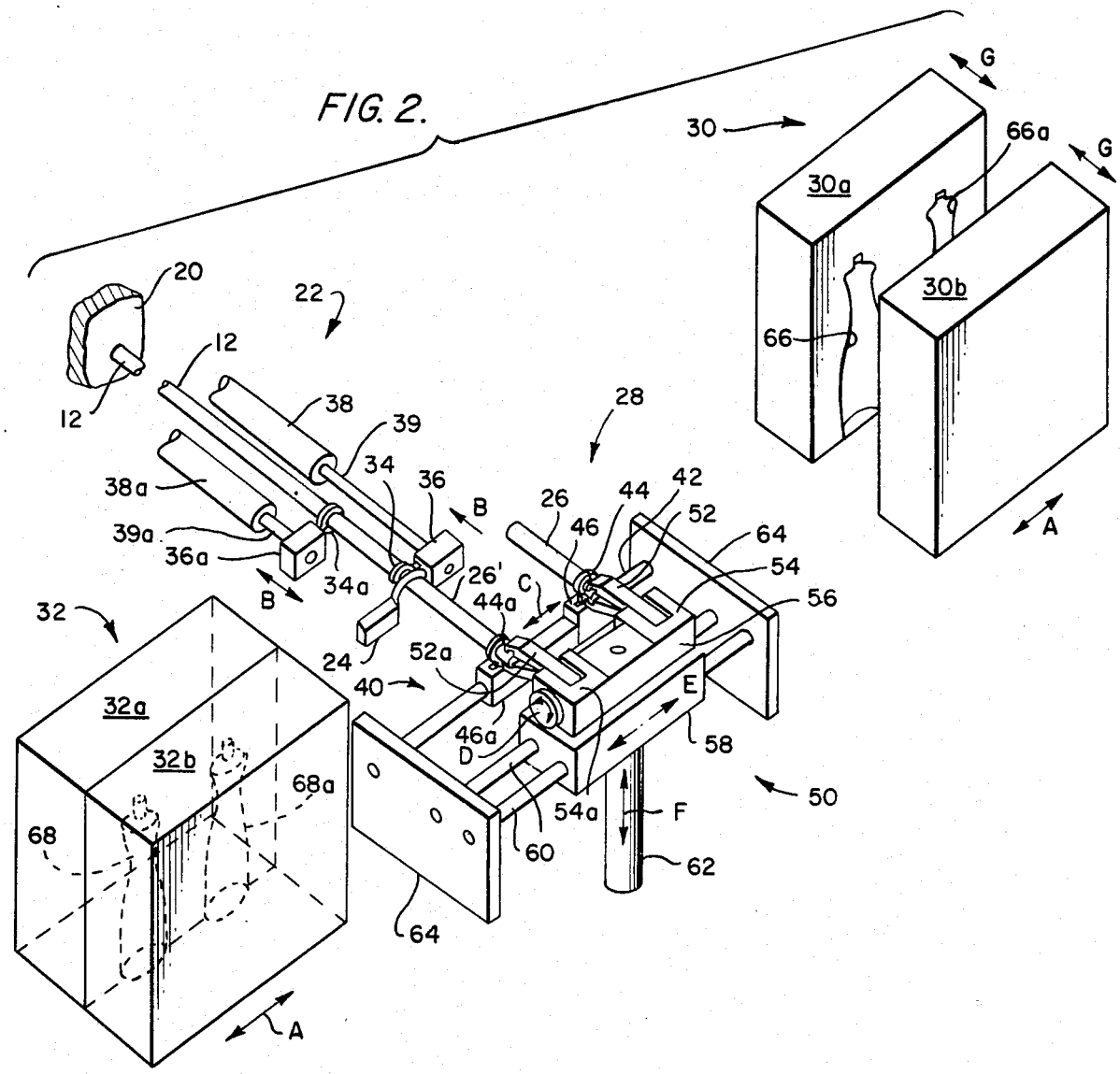
FIG. 2 is a partial, perspective view of one embodiment of the parison transfer assembly.

An embodiment of the puller assembly 22 and the transfer assembly 28 is shown in FIG. 2. The puller assembly 22 includes two, identical units, one disposed along each side of the tube 12. For convenience, the structural elements positioned along the left side of the tube 12 (as seen in FIG. 2) will be identified with a subscript "a", and the following description for the right unit is equally applicable to the left unit. Each of the pulling units for the puller assembly 22 includes a pair of pivoted grippers 34 coupled to an actuation means 36 which controls the opening and closing of the grippers onto the tube 12. The actuation means 36 is disposed for longitudinal movement along an axis parallel to the longitudinal axis of the tube 12, and is so moved by an actuator 38, such as a conventional hydraulic cylinder, coupled to the actuation means 36 by a connecting rod 39. As the actuation means 36 reaches a position adjacent to the cutter 24, the grippers 34 are opened, releasing the tube 12, and the actuator 38 initiates return motion of the means 36, in the direction indicated by the arrow B. Meanwhile, the actuation means 36a of the pulling assembly on the other side of the tube 12 is in its rearward position, with the grippers 34a closed upon the tube 12, and the actuator 38a initiates forward movement of the actuation means. In its open position the grippers 34 are sufficiently separated to permit the closed gripper 34a to pass through, such that in operation the units of the puller assembly 22 operate in a hand-over-hand manner to pull the tube 12 from the oven 20 and to move the tube past the cutter 24. It can be appreciated that the length of travel effected by the actuator 38 is controllably regulated to determine the length of the parison 26 which is severed from the tube 12 by the cutter 24.

The transfer assembly 28 includes a preliminary shuttle and accumulator, or "pre-shuttle", 40 moved along a support member 42, as indicated by the arrow C, by conventional actuation means (not shown) in a plane perpendicular to the longitudinal axis of the tube 12. The pre-shuttle 40 includes a first set of pivoted jaws 44 coupled to an actuator 46, and a second, identical assembly 44a, 46a is disposed to the left (relative to the showing of FIG. 2). The sets of jaws 44 and 44a are independently operable by the respective actuators 46, 46a to open and close the jaws within the aforesaid plane of movement of the pre-shuttle 40.

A main shuttle, or simply "shuttle", 50 is disposed for movement in a plane parallel to that of the pre-shuttle 40, and includes pairs or sets of clamps 52 and 52a coupled to respective actuators 54 and 54a which effect the opening and closing of the clamps. The clamp sets 52, 52a and the actuators 54, 54a are supported upon a clamp carriage 56 which is pivoted by rotary means in the direction indicated by the arrow D, from a first position in which the clamps extend horizontally, in the plane containing the longitudinal axis of the tube 12, to a second position in which the clamps extend vertically. The clamp carriage 56 in turn is supported upon a main shuttle carriage 58 slidably supported on rods 60 and moved in the direction of the arrow E by conventional means (not shown). An actuator 62 is coupled by an extension rod 63 (FIGS. 10 and 11) to the clamp carriage 56 to effect extension and retraction of the carriage and the clamp sets 52, 52a relative to the shuttle carriage 58, in the direction of the arrow F. The purpose of this extension and retraction of the clamp sets 52, 52a will be described more fully below.

As can be seen in FIG. 2, each of the blow molders 30 and 32 comprise two, separable mold sections denoted respectively by subscripts "a" and "b." These mold sections, such as sections 30a, 30b, are suitably supported on a mold carriage (not shown) for movement away and towards each other, in the direction indicated by the arrows G. Each mold section is provided with two molding cavities, such as 66, 66a and 68, 68a in the blow molders 30 and 32, respectively. While not specifically shown in the drawings, it is understood that each blow molder 30 and 32, together with the structure and equipment associated therewith, are appropriately supported on a mold carriage, and actuation means are provided to open and close the mold sections and to move each blow molder from its molding position, as indicated in FIG. 2, outboard of the centerline of the tube 12, to an inboard, parison-receiving position over the main shuttle 50. This will be described more fully below.

Figure 3:
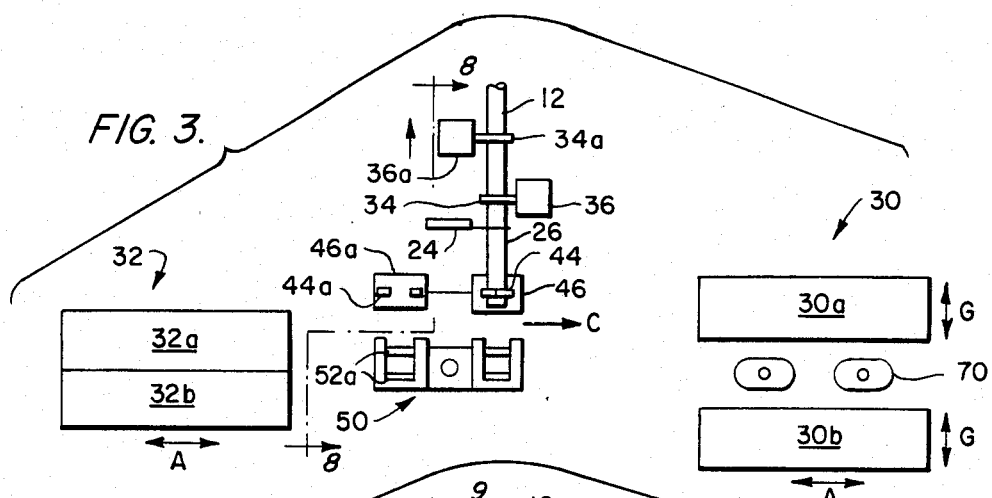
FIGS. 3-7 are schematic plan views illustrating the operation of the puller assembly and the parison transfer assembly embodiment illustrated in FIG. 2.

The operation of the puller assembly 22 and the transfer assembly 28, and the positioning of the parisons within the blow molders 30 and 32 will be described with reference to FIGS. 3-12 of the drawings. Some of the structural features shown in FIGS. 8-12 have not been shown in the plan views of FIGS. 3-7 to enhance the clarity of the latter figures. For convenience the parison associated with the right set of jaws 44 and the right clamp set 52 will be identified as 26, ad the parison associated with the left set of jaws 44a and the left clamp set 52a will be identified as 26'. In FIG. 3, the set of grippers 34 has moved to its extreme forward position adjacent to the cutter 24, and the free end of the tube 12 has been gripped by the right set of jaws 44 on the pre-shuttle 40. The left set of jaws 44a of the pre-shuttle 40 is also open. The sections of the blow molder 32 are still closed, with the blow molding process continuing upon the parisons placed therein earlier in the process. As can be seen in FIG. 8, the mold sections 30a and 30b are opened, and the formed containers 70 (one visible) are being released.

Figure 4:
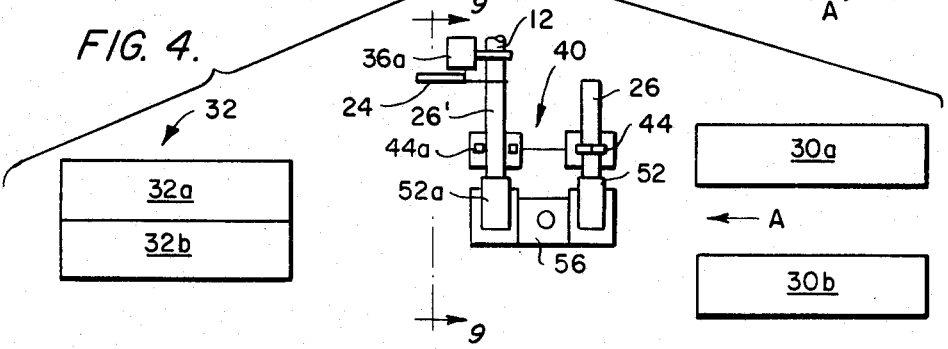

In FIG. 4, the mold sections 30a, 30b remain in the open or separated condition in preparation for receiving the next set of parisons. The blow molding process continues in the blow molder 32. A parison 26 has been cut from the tube 12 by the cutter 24 and the pre-shuttle 40 has been shifted to the right to position the left set of jaws 44a in alignment with the longitudinal axis of the tube. By this time, both clamp sets 52, 52a have been rotated into the horizontal positions and the shuttle 50 has been shifted to the right by movement of the shuttle carriage 58, with the left clamp set 52a aligned with the tube 12. Both clamp sets remain open so that the right clamp set 52 passes over the portion of the parison 26 extending from the right pair of jaws 44. The jaws 44a remain open, and the end of the tube 12 is passed through and received within the clamps 52a. At this time, the end of each of the parisons 26 and 26' is received within the open clamp sets 52 and 52a, respectively, which are then closed onto both parisons and the cutter 24 is activated to sever the parison 26' from the tube 12. As shown in FIG. 9, the parison 26' has been advanced by the forward movement of the grippers 34a which, after severing by the cutter 24, releases the tube 12 and begins its backward movement, to the left in FIG. 9. Both clamp sets 52, 52a on the shuttle 50 are rotated simultaneously, clockwise in the showing of FIG. 9, to position the parisons 26, 26' vertically in preparation for placement within the blow molder 30.

Figure 5:
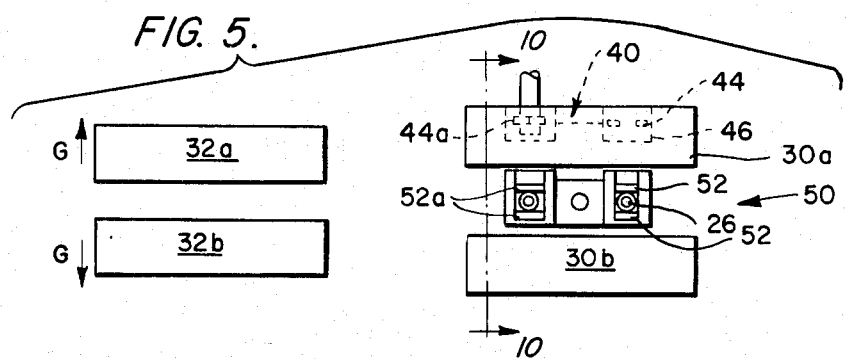

Meanwhile, the open mold sections 30a, 30b of the blow molder 30 are moved in the direction of the arrow A in FIG. 4 to receive the parisons from the shuttle 50. This condition is shown in FIG. 5, which also shows sections 32a, 32b of the blow molder 32 beginning to open after the blow molding process has been completed therein. The shuttle clamp sets 52, 52a, along with the actuators 54, 54a and the clamp carriage 56 are raised vertically by the extension actuator 62 to place the parisons onto the blow pins 72 (one visible in FIGS. 8-12) associated with the blow molder 30. This can be seen in FIG. 10, which also shows a pair of tube clamps 74 having closed onto the upper portion of the parisons to clamp the parisons onto the blow pins 72. After the parisons have been clamped, the clamp carriage 56 is retracted by the actuator 62, with the clamp sets 52, 52a still firmly gripping the ends of the parisons. The retraction of the clamp carriage 56 longitudinally stretches the parisons, axially orienting the material, and the parison stretching continues until the shuttle carriage reaches an intermediate position determined by the desired axial stretch ratio required for the parison. This is shown in FIG. 11, which is a view similiar to that of FIG. 10, but at a later time in the process. At this time, the mold sections 30a, 30b are closed on the stretched parisons, and when the mold sections are fully closed, ridges 76 disposed on the lower portion of the mold sections pinch a lower portion of the parison shut, forming a sealed lower surface for the container to be blown. By continued retraction of the clamp carriage 56, the bottom surplus from the parisons may be severed and are discarded when the clamp sets 52, 52a are opened. After the mold sections 30a, 30b are fully closed the blow molder 30 is returned to its blow molding position.

Figure 6:
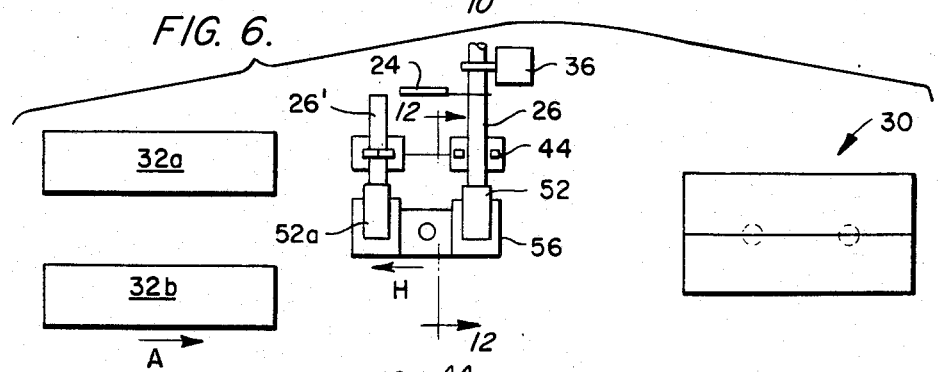

As can be seen in FIG. 5, while the clamp carriage 56 is being retracted to stretch the parisons, a second set of parisons is being accumulated on the pre-shuttle 40, with the end of the next parison being clamped by the left set of jaws 44a to be severed by the cutter 24. The condition shown in FIG. 6 is substantially similar to that of FIG. 4, except that now the shuttle 50 has been shifted to the left, as indicated by the arrow H, to position the right clamp set 52 in alignment with the longitudinal axis of the tube 12. At this point a new parison 26', gripped by the left set of jaws 44a on the pre-shuttle 40, has been severed, and is aligned with the left clamp set 52a on the shuttle 50. The jaws 44 on the pre-shuttle remain open, a new parison 26 extends therethrough and is received within the open clamp set 52. Both clamp sets 52, 52a of the shuttle 50 are then closed onto the respective end portions of the parisons 26, 26', at which time the cutter 24 is activated to sever the parison 26 from the tube 12. The clamp sets 52, 52a are then rotated in the manner described above to position the parisons vertically for placement within the blow molder 32.

Figure 7:
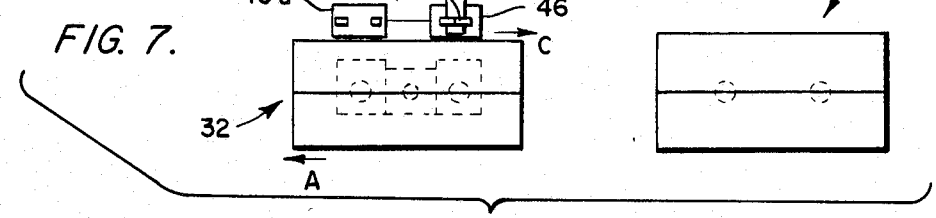

In FIG. 7, the cycle is continuing, with the end of the next section of tube 12 being gripped by the right set of jaws 44 on the pre-shuttle 40. After the parison 26 has been severed, the pre-shuttle 40 is shifted to the right, in the direction of the arrow shown in FIG. 7. Meanwhile, the clamp sets 52, 52a on the shuttle 50 have completed their retraction, and have been rotated into their horizontal positions. At this point, the orientation of the pre-shuttle 40 and the shuttle 50 is the same as that shown in FIG. 3, and the next cycle begins with the shuttle carriage 58 being shifted to the right, in the direction of the arrow C shown in the figure.

A number of other features of the present blow molding apparatus are shown in FIGS. 8-12. A tubular sleeve 78 is coaxially disposed about each blow pin 72, and reciprocated independently relative to the blow pin. A stripper plate 80 cooperates with the sleeve 78 to remove surplus material clinging to the sleeve. The blow pin 72, the sleeve 78 and the stripper plate 80 are supported by an actuator assembly 82 which also includes means to regulate the independent movement of the blow pin and the sleeve. The actuator assembly 82 is supported on and moves with the mold carriage (not shown), and the operation of the blow pin 72 and the sleeve 78 are coordinated with the opening and closing of the mold sections 30a, 30b. Toward the latter stages of the blow molding of the container 70 within the blow molder 30, the tubular sleeve 78 is extended into the neck region of the mold sections to sever the surplus parison material 84 from the neck region of the formed container to provide a finished end opening for the container. The surplus material 84 attaches to the tubular sleeve 78, and upon retraction of the sleeve the surplus material is removed from the mold. Continued retraction of the tubular sleeve 78 pulls the surplus material 84 against the lower surface of the stripper plate 80, stripping the surplus material from the tubular sleeve. The surplus material drops between the open mold sections, and since the formed container has been released earlier, the container and the surplus material can be readily separated by conventional means. The process herein described can be seen from FIGS. 8 and 9. It is understood that a blow pin and a coaxial sleeve are provided for each molding cavity in the blow molder although only one set has been described and shown in the drawings.

In a known fashion, the blow pin may also function to calibrate or size the inner diameter of the container neck opening, and the tubular sleeve may be used to force oriented material into the neck region of the container during its downward motion, to form well-defined closure projections, such as closure threads, on the outer surface of the container neck. A suitable technique for finish forming the container neck and the closure projections thereon to provide the finished container neck with oriented material is disclosed in the aforesaid LeGrand patents.

It has been noted above that closure of the mold sections causes the ridges 76 on the lower end portions of the mold sections to close onto the parison and to compression form a weld or seam 88 along the bottom surface of the formed container 70. The container 70 may also be provided with a concave bottom surface, or bottom push up, 86 which is integrally formed during the molding process by mold bottom inserts 90 secured to the lower surface of the mold sections. To provide sufficient clearance for removal of the formed container 70, the mold bottom inserts 90 are supported to permit movement of the bottom inserts relative to the mold sections. This can be achieved, for example, by pivotally connecting the bottom inserts 90 to the lower surface of the mold sections, such as shown in FIGS. 8 and 9. After separation of the bottom surplus 92, actuation means (not shown) are then provided to cause the bottom inserts 90 to pivot downwardly as the mold sections 30a, 30b open to permit removal of the formed containers 70. After the containers have been removed, the actuation means pivots the bottom inserts 90 into their operative position, in the direction of the arrows shown in FIG. 9. Conveniently, if the blow molder sections are provided with the bottom inserts 90, then the weld-forming ridges 76 may be provided along the exposed edges of the bottom inserts. Alternatively, the mold bottom inserts 90 can be supported by the mold sections to permit relative motion other than pivotal, such as downward movement of the inserts.

Figure 13:
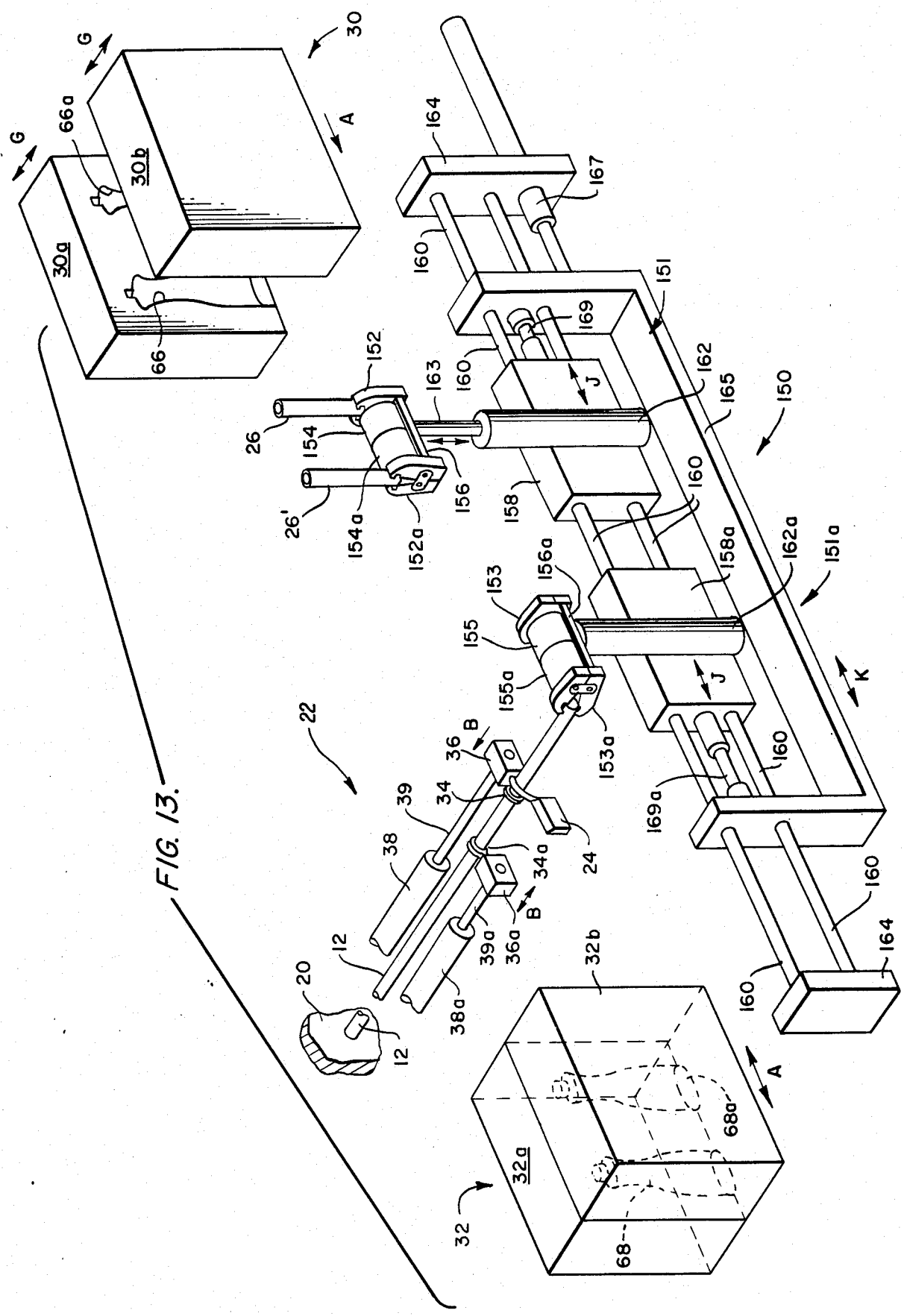
FIG. 13 is a partial, perspective view of an alternate embodiment of the parison transfer assembly.

Shown in FIG. 13 is an alternate embodiment of the parison transfer assembly, in which corresponding parts have been designated by the same reference numerals as part of a "100" series. However, the structural elements which are common to the embodiments of FIG. 2 and FIG. 13, such as the puller assembly 22 and the blow molders 30, 32, have been identified with the same reference characters. A parison transfer mechanism 150 includes two shuttles, a right shuttle 151 and a left shuttle 151a in the view of FIG. 13, which move in the same plane, perpendicularly to the longitudinal axis of the tube 12. The structure and operation of each shuttle is identical; therefore, the following description of the right shuttle 151 will also supply to the left shuttle 151a, and the reference characters are identical, except that a subscript "a" has been used whenever possible to designate the corresponding structural elements of the left shuttle 151a.

The shuttle 151 includes two pairs or sets of pivoted clamps 152 and 152a, coupled respectively to actuators 154 and 154a which operate independently to control the individual operation of the respective set of clamps. The clamp sets 152, 152a and the actuators 154, 154a are commonly supported on a clamp carriage 156, which in turn is mounted for movement on a shuttle carriage 158. The shuttle carriage 158 is slidably supported by a pair of support rods 160, and an actuator 169, connected at one end to a vertical portion of a carriage support 165, operates to move the shuttle carriage along the rods. A vertical actuator 162 is attached to the shuttle carriage 158, with an extension rod 163 connecting the clamp carriage 156 to the shuttle carriage. Operation in a conventional manner of the vertical actuator 162, which may be a hydraulic cylinder, raises and lowers the clamp carriage 156 to position a pair of parisons 26, 26' onto blow pins (not shown) within the mold cavities of the blow moder 30, in the same manner as described above. The operation of the blow molder 30 is as described above, and the operation of the shuttle 151 is identical to the shuttle 50 described above.

As shown in FIG. 13, the support rods 160 are fixed at their ends by supports 164, and the carriage support 165 is also slidable along the rods, being thusly moved by a support actuator 167 fixed to one of the supports 164. Hence each of the shuttles 151, 151a is slidable relative to the carriage support 165 and the carriage support and shuttles are movable as a unit relative to the supports 164.

Figure 14:
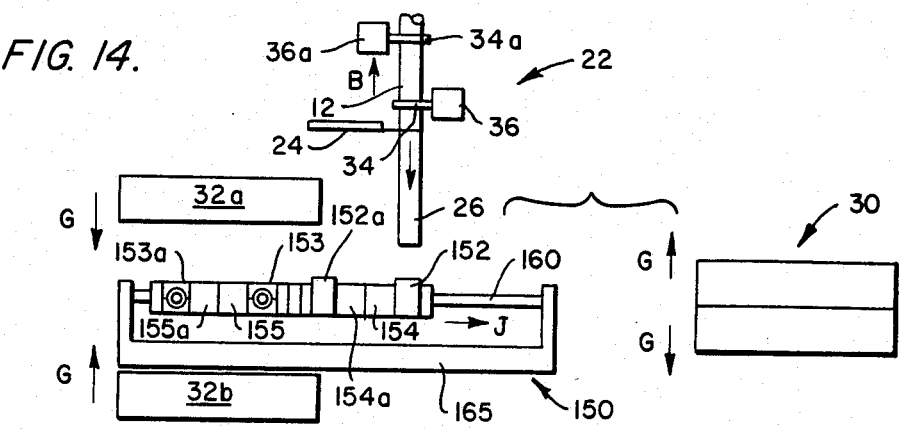
FIGS. 14-17 are schematic, plan views illustrating the operation of the parison transfer assembly shown in FIG. 13.
Figure 15:
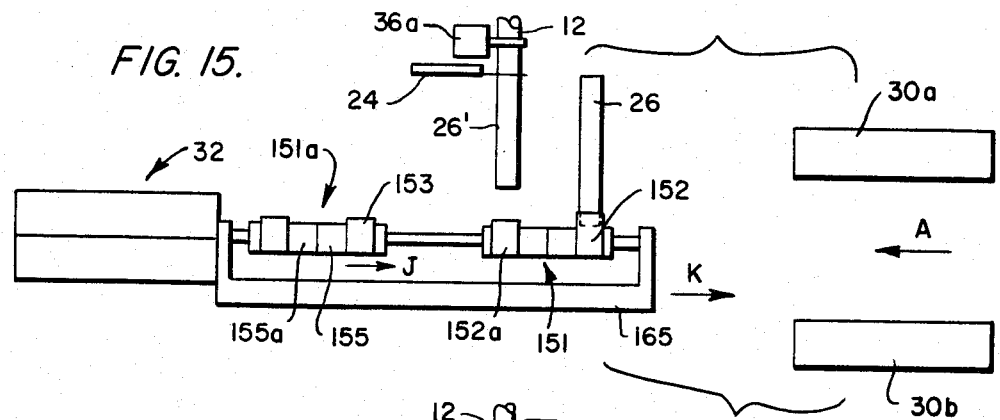
Figure 16:
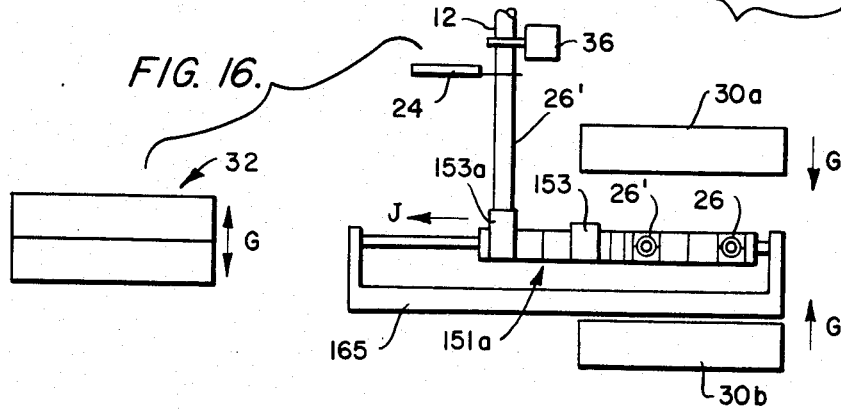

FIGS. 14–17 schematically illustrate the operation of the parison transfer assembly 150. The operation of the puller system 22 is identical to that described above relative to the parison transfer assembly 28. Briefly, the pairs of grippers 34, 34a operate in a hand-over-hand manner to pull tube 12 from the oven 20 pass the cutter 24. In FIG. 14, the clamp sets 152, 152a of the right shuttle 151 are rotated into horizontal positions, parallel to the longitudinal axis of the tube 12, with the right clamp set 152 aligned with the tube. The clamp set 152 is closed by the actuator 154 to grip the free end of the parison 26, after which the cutter 24 is operated to sever the parison from the tube 12. The longitudinal actuator 169 (FIG. 13) is activated to shifte the right shuttle 151 to the right, in the direction of the arrow J in FIG. 14, to the position shown in FIG. 15, to align the clamp set 152a with the tube 12. The clamp set 152a is then closed onto the end of the tube 12, the cutter 24 activated to sever the parison 26' from the tube, and the right shuttle 151 is rotated to position the parisons vertically, as shown in FIG. 16. Meanwhile, the open mold sections 30a, 30b of the blow molder 30 are moved in the direction of the arrow A (FIG. 15), toward the centerline of the tube 12. At the same time, the support actuator 167 (FIG. 13) is activated to shift the carriage support 165 to the right, in the direction of the arrow K in FIG. 15, until the relative position of the mold 30 and the right shuttle 151 is as shown in FIG. 16. The clamp carriage 156 is raised by the vertical actuator 162 to place the parisons 26, 26' within the molding cavities of the molder 30, in the manner described above, after which the mold sections 30a, 30b are closed.

Figure 17:
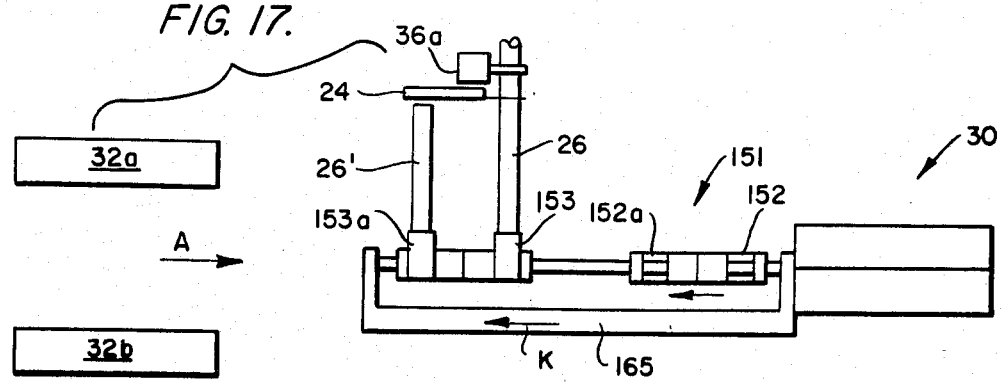

The process continues with activation of the left longitudinal actuator 169a to shift the left shuttle 151a to the right, from the position shown in FIG. 15 to the position shown in FIG. 16, to align the clamp set 153a with the tube 12. The clamp set 153a is closed onto the end of the tube 12, after which the parison 26' is severed by the cutter 24 from the tube. The longitudinal actuator 169a is activated again to shift the left shuttle 151a to the left, in the direction of the arrow J indicated in FIG. 16, to position the clamp set 153 in alignment with the axis of the tube 12, as shown in FIG. 17, with the parison 26 being severed from the tube 12 after the clamp set 153 has been closed thereon. At this time, the support actuator 167 (FIG. 13) shifts the carriage support 165 to the left, in the direction of the arrow K shown in FIG. 17, and at the same time the open mold sections 32a, 32b are moved to the right, in the direction of the arrow A. The longitudinal actuator 169 shifts the right shuttle 151 to the left after the clamp sets 152, 152a have been rotated horizontally. At this time the orientation of the parison transfer assembly 150 is as shown in FIG. 14, with the parisons gripped by the left shuttle 151a being placed within the blow molder 32, and the process is repeated as described above for the blow molder 30.

In the foregoing description the clamp sets 52, 52a and 152, 152a are controlled by the respective actuators 54, 54a and 154, 154a so that the clamps open and close about a pivot axis parallel to the rotational axis of the shuttles. Other clamp orientation and operational modes may be equally suitable. For example, each clamp set may open and close relative to a pivot axis normal to the rotational axis of the shuttles, in which case the clamp carriage 56 and 156 will be shifted first and the clamp sets then rotated into their horizontal positions, over the ends of the parisons. The actuators then close the clamps onto the end portions of the parisons.

It can be appreciated that other techniques may be incorporated for placing the parisons within the molding cavity of the blow molders and for effecting longitudinal stretching of the parison. For example, the shuttles of the parison transfer assemblies 28 and 150 can operate in the manner described above to accumulate a pair of parisons and to rotate the parisons vertically. However, instead of the shuttles being extended vertically to position the parisons in the moldir cavity, the blow pin assembly, including the blow pins and the concentric sleeves, may be lowered in a known fashion to slip the blow pin onto the upper ends of the parisons, after which the parisons are clamped and stretched as the blow pin assembly is raised. One example of a technique for effecting this method of parison placement and parison stretching is illustrate in FIGS. 18-22, in which parts similar to or corresponding to those shown in FIGS. 1-17 and described above have been designated as parts of a "200" series reference characters.

As shown in FIG. 18, the tube 212 is advanced in the direction of the arrow by the grippers 236a, past the cutter 224 and toward the clamp sets 252a which is oriented horizontally. The end of the parison 226 (partially visible), has been gripped by the clamp set 252 (also partially visible), and the grippers 236 are retracted in the direction of the arrow B. While FIG. 18 shows the embodiment of the preshuttle and shuttle transfer assembly 28 illustrated in FIGS. 2-12 and described above, the transfer assembly 150 shown in FIGS. 13-17 would be equally suitable.

Also shown in FIG. 18 are the separated mold sections 230a, 230b, with a reciprocable blow pin assembly 294 extending there between. The blow pin assembly 294 includes, for each molding cavity, a reciprocable blow pin 272, a tubular sleeve 278 (not visible) coaxially disposed about the blow pin and reciprocable relative to the blow pin, and a pair of pivoted tube clamps 296 which are pivoted about an axis orthogonal to the longitudinal axis of the blow pin 272 and caused to open and close by the actuator 297. The blow pin assembly 294 and its associated components and the mold sections 230a, 230b are provided with known operational control and support means (not shown).

In FIG. 19, both parisons 226, 226' have been grasped by the clamp sets 252, 252a (only one set is visible) and rotated from the horizontal positions into the vertical positions, after which the blow pins 272 have been lowered into the free, open ends of the parisons. The pivoted tube clamps 296 are then closed onto the upper end portions of the parisons, and with the clamp sets 252, 252a still firmly grasping the lower end portions, the blow pin assembly 294 is raised in the direction of the arrow, stretching the parisons axially.

After the pivoted tube clamps 296 have cleared the upper portion of the mold and the parisons have been stretched to the desired axial stretch ratio (FIG. 20), the mold sections 230a, 230b are closed onto the parisons (FIG. 21), after which formation of the container necks and closure threads, if provided and blow molding of the containers begins. These functions may be achieved by any suitable means and process, such as those disclosed in the aforesaid LeGrand patents.

The clamp sets 252, 252a are then opened, rotated into the horizontal direction (FIGS. 21 and 22) and shifted laterally to receive and grasp the next set of parisons, in the manner described above. The pivoted tube clamps 296 are opened, and after the containers have been properly blow molded, the mold bottom inserts 290 are lowered, removing the bottom surplus material 292, and the mold sections separated (FIG. 22) to permit removal of the formed container 270, as described above. The neck surplus materials 284 are then removed from the tubular sleeves 278, and the cycle is repeated in the manner already described.

It can be appreciated that the blow pin assembly can be raised and lowered by itself, independently of the molder, to receive and stretch the parisons while the molder remains at the same vertical level. Alternatively, the blow pin assembly and the molder can be lowered as a unit from the blow molding position to permit the blow pins to receive the parisons, after which the blow pin assembly is raised between the open mold sections to stretch the parisons. Subsequent to molder closure, the molder and blow pin assembly can then be raised as a unit and returned to the blow molding position.

Additionally, as noted above, one or more blow molders may be used and one or more molding cavities may be incorporated into each blow molder, along with the requisite shuttle and pre-shuttle structures. Further, instead of the blow molder being moved to receive the parisons, the molder may remain stationary and the parison transfer assembly moved into position with the molder to place the parisons therein, or both the molder and the transfer assembly move to a common position, in a manner similar to the embodiment shown in FIG. 13.

This invention is applicable for the formation of molecularly oriented articles from any orientable thermoplastic resin, such as polyolefins, poly(vinyl chlorides), acrylonitrile-butadiene-styrene polymers, styrene-butadiene copolymers, various styrene polymers and copolymers, polyamides, polyvinvlidene chloride polyers and copolymers, and the like. In addition to polypropylene noted above, which is a preferred resin, other perferred resins include crystalline polymers such as polymers of at least one mono-l-olefin having 2-8 carbon atoms per molecule, and more preferably, polymers and copolymers of ethylene, propylene, and l-butene.

Although not particularly illustrated in the drawings, it is understood that all of the components described above are arranged and supported in an appropriate fashion to form a complete and operative system. Further, it is understood that all ancillary components, such as hydraulic components, pumps, pressurized fluid sources, control systems, etc., have not been specifically described, but such components are known in the art and would be appropriately incorporated into the operative system.

Of course, variations of the specific constructions and arrangement of the blow molding systems for forming hollow containers of oriented material disclosed above can be made by those skilled in the art without departing from the invention as defined in the appended claims.

What is claimed is:

1. A process for the formation of finished hollow containers of molecularly oriented plastic material from tubular parisons of orientable material heated to a suitable orientation temperature for the material, comprising:
   a. providing along a horizontal axis a supply of tubular parisons of orientable material;
   b. transferring parisons with a transfer means having adjacently disposed gripping means rotatable about an axis oriented perpendicularly to the supply axis by operating said transfer means to move said parison gripping means in a plane oriented substantially perpendicularly to said horizontal supply axis to align each gripping means along said horizontal axis, to grip an end portion of a parison with each gripping means and to rotate gripped parisons from the horizontal position;
   c. providing a molder having molding means to form a container;
   d. gripping the free end portion of a rotated parison and stretching the parison longitudinally to molecularly orient the parison material;
   e. placing the stretched parison in the molder wherein substantially the entire container is formed from the molecularly oriented material of the stretched parison; and
   f. returning the transfer means into position to receive and transfer additional parisons.

2. A process as defined in claim 1, wherein the providing step (c) includes positioning said molder in a parison receiving position, and the process further includes moving said molder to a container forming position after the stretched parison has been received therein.

3. A process as defined in claim 2, wherein the process steps are repeated, and the providing step (c) is the positioning of a second molder in a parison receiving position, said second molder having molding means to form a container.

4. A process as defined in claim 2, wherein the step (a) of providing the supply of tubular parisons includes:
   pulling a continuous tube of heated orientable material from a heating means; and
   severing individual parisons from the tube.

5. A process as defined in claim 4, wherein said molder has means for simultaneously forming at least two containers, and the process steps occur with at least two tubular parisons.

6. A process as defined in claim 2, wherein the movement of the transfer means and the molder occur in a common plane.

7. A process as defined in claim 4, further including accumulating parisons in an accumulator reciprocally movable in a plane substantially parallel to the plane of movement of said transfer means, said accumulator receiving and temporarily holding parisons in horizontal position to be received by said transfer means.

8. A process as defined in any of claims 1, 2, 3, 4 or 5, wherein the stretching and placement of steps (d) and (e) includes:
   g. extending the transfer means to place the rotated parison within the molder;
   h. gripping the free end portion of the parison; and
   i. retracting the transfer means from the molder and stretching the parison longitudinally during the retraction.

9. A process as defined in any of claims 1, 2, 3, 4 or 5, wherein the stretching and placement of steps (d) and (e) includes:
   g. extending the molding means to receive the rotated parison;
   h. gripping the free end portion of the parison; and
   i. retracting the molding means to stretch the parison longitudinally during retraction.

10. A process for the blow molding of finished hollow containers of molecularly oriented plastic material from tubular parisons of orientable material heated to a suitable orientation temperature for the material, comprising:
    a. pulling a continuous tube of heated orientable material from a heating means;
    b. severing individual parisons from the continuous tube;
    c. transferring parisons with a transfer means having adjacently disposed gripping means rotatable about an axis oriented perpendicularly to the longitudinal axis of the continuous tube by operating said transfer means to move said parison gripping means in a plane oriented substantially perpendicularly to the longitudinal axis of the tube to align respective gripping means with said axis, to grip an end portion of a parison with each gripping means and to rotate gripped parisons from the direction of the continuous tube;
    d. moving a blow molder having separable sections and container forming means from a molding position to a parison receiving position adjacent to the longitudinal axis of the tube to receive a rotated parison, the movement of said blow molder between said positions being in the plane of movement of the transfer means;
    e. stretching the parison longitudinally between the sections of the blow molder to molecularly orient the parison material;
    f. closing the mold sections on the stretched parison;
    g. moving the blow molder to the molding position whereat substantially the entire container is formed from the molecularly oriented material of the stretched parison; and
    h. returning the transfer means to receive additional parisons.

11. A process as defined in claim 10, wherein:
    the moving step (d) includes moving a second blow molder having separable sections and container forming means from a molding position to a parison receiving position adjacent to the longitudinal axis of the tube, the movement of said second blow molder being in the plane of movement of the transfer means;
    repeating process steps (e)–(h) with said second blow molder; and
    repeating the process alternately with said blow molder and said second blow molder.

12. A process as defined in claim 11, wherein the transfer means comprises two sets of adjacently disposed parison gripping means movable in said plane oriented perpendicularly to the longitudinal axis of the tube, each set of gripping means rotatable and movable within the plane independently of each other, one set of said gripping means cooperating with one of said two blow molders and the second set of gripping means cooperating with the remaining blow molder.

13. A process as defined in claim 12, including shifting the transfer means within the plane of movement of the gripping means to position each gripping means in the parison receiving position of the associated blow molder.

14. A process as defined in any of claims 10, 11, wherein the stretching of step (e) includes:
   i. extending the transfer means, with said molder in the parison receiving position, to place the rotated parison within the separated mold sections;
   j. gripping the free end portion of the parison by grippers disposed in cooperative relation to the molder; and
   k. retracting the transfer means to stretch the parison longitudinally.

15. A process as defined in claim 14, further including temporarily storing a parison in a holding device, and operating said device to move it in a plane parallel to the transfer means to receive a parison and temporarily hold the parison for gripping by the transfer means.

16. A process as defined in claim 15, wherein the holding device includes two holding means adjacently disposed, and movable in said plane to align each holding means with each of the gripping means on the transfer means.

17. A process as defined in claim 15, wherein the continuous tube is pulled from the heating means by a pair of pullers movable along the longitudinal axis of the tube and operating in a hand-over-hand fashion to pull the tube.

18. A process as defined in any of claims 10, 11, wherein the stretching of step (e) includes:
   i. extending the container forming means, with said molder in the parison receiving position, to receive the rotated parison secured on said transfer means;
   j. gripping the free end portion of the parison by grippers disposed in cooperative relation to said container forming means; and
   k. retracting the container forming means and the grippers to stretch the parison longitudinally.

19. A process as defined in claim 18, further including temporarily storing a parison in a holding device, and operating said device to move it in a plane parallel to the transfer means to receive a parison and temporarily hold the parison for gripping by the transfer means.

20. A process as defined in claim 19, wherein the holding device includes two holding means adjacently disposed, and movable in said plane to align each holding means with each of the gripping means on the transfer means.

21. A process as defined in claim 18, wherein the continuous tube is pulled from the heating means by a pair of pullers movable along the longitudinal axis of the tube and operating in a hand-over-hand fashion to pull the tube.

* * * * *